FREQUENCY ALLOCATION SYSTEM FOR COMMON AMPLIFICATION OF MULTIFREQUENCY CARRIERS

Filed Aug. 3, 1965

INVENTORS
MASASUKE MORITA
MASAHISA MIYAGI
BY
Hopgood & Calimafde
ATTORNEYS

INVENTORS
MASASUKE MORITA
MASAHISA MIYAGI
BY
Hopgood & Calimafde
ATTORNEYS

United States Patent Office 3,480,733

Patented Nov. 25, 1969

3,480,733

FREQUENCY ALLOCATION SYSTEM FOR COMMON AMPLIFICATION OF MULTIFREQUENCY CARRIERS

Masasuke Morita and Masahisa Miyagi, Tokyo, Japan, assignors to Nippon Electric Company Limited, Tokyo, Japan, a corporation of Japan Filed Aug. 3, 1965, Ser. No. 476,814
Claims priority, application Japan, Aug. 4, 1964, 39/44,531
Int. Cl. H04j *1/18*
U.S. Cl. 179—15 4 Claims

ABSTRACT OF THE DISCLOSURE

A device and method for combining a plurality of carrier signals for amplification by a common amplifier is described wherein the frequencies of the carrier signals are selected in a manner to provide minimum intermodulation products occurring within the pass band of the common amplifier. The spacings between the carrier signals within the pass band are selected to gradually decrease towards an end of the bandwidth. Several relationships for obtaining this gradual spacing are described.

Figure 1:
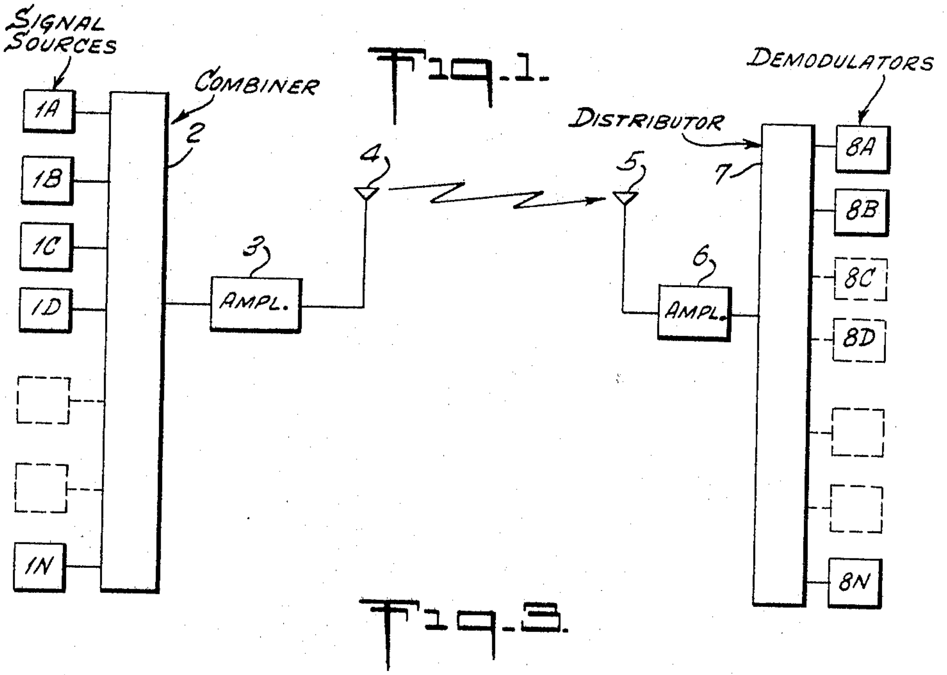

This invention relates to frequency allocation systems. More particularly it relates to such systems designed to minimize the amount of intermodulation due to the intermodulation products falling within the usable frequency pass bandwith, which are caused by nonlinearity of the input versus output gain characteristic of the amplifying unit when multifrequency carriers are amplified by a common amplifier and involving a means for arranging the carrier frequencies in such a manner that frequency spacings may become gradually shorter towards each end of the pass band and longer towards the center frequency of the pass band.

It has been common practice to amplify multifrequency carriers by a common amplifier installed in a receiving subsystem, however, similar arrangements have been seldom employed with transmitting subsystems. This is because the input versus output gain characteristic of the common amplifier used in transmitting subsystems is usually nonlinear, and therefore the intermodulation products between carriers falling within the frequency bandwith employed become undesired interference signals and give rise to intermodulation with the desired signals.

The problem of common amplification of multifrequency carriers is dealt with in a treatise entitled "Analysis of Multiple Tone Clipping" by C. J. Stypers in the I.R.E. International Convention Record, Part 8, 1961, pp. 134 through 149. As will be evident from this treatise, the conventional equally-spaced frequency allocation system possesses an inherent defect in that the intermodulation products occurring by the presence of the nonlinear 3rd order distortion coefficient become predominant over the higher order intermodulation products and they tend to concentrate most abundantly near the center frequency of the usable frequency band, thereby becoming interference signals.

In amplifying such multifrequency carriers by means of a common amplifier and transmitting amplified signals in a radio carrier telephone system, the degree of minimization of the amount of intermodulation due to the intermodulation products between carriers becomes one of the essential factors in assessing the quality of a radio carrier telephone system.

Accordingly, it is an object of this invention to provide a frequency allocation system for reducing the amount of intermodulation occurring in the usable frequency band to a minimum, in a transmission system in which a plurality of carriers of different frequencies are amplified by a common amplifier, thereby to make possible a transmission system of high quality.

An outstanding feature of the invention is that in amplifying multifrequency carriers having a plurality of different frequencies by a common amplifier, means for allocating carrier frequencies is involved in such a manner that their locations become dense gradually towards each limit of the passband and sparse gradually towards the center frequency of the passband. Generally speaking, when the usable frequency bandwidth (pass bandwith) is markedly wider than the summation of the allotted frequency bandwidths, the amount of intermodulation occurring in the allotted frequency bands can be kept to a minimum by arranging the intermodulation products to fall outside the allotted band location in the usable frequency band.

Figure 3:
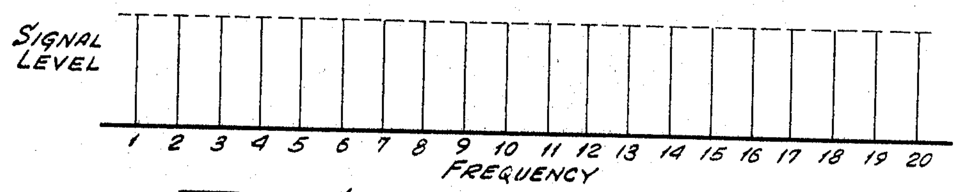
Figure 4:
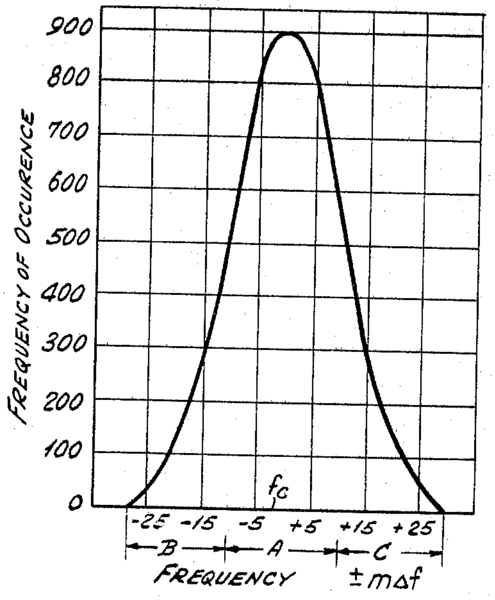
Figure 2:
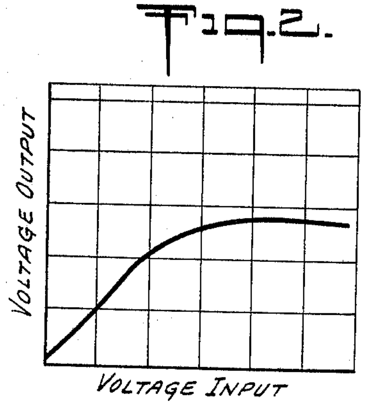
Figure 5:
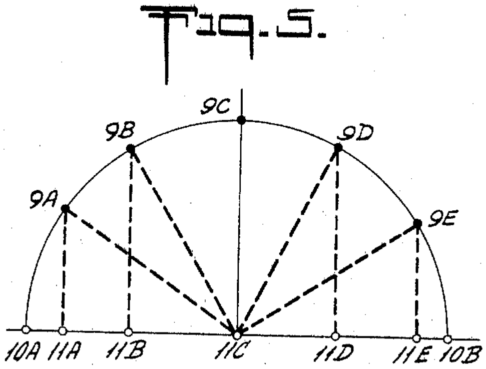
Figure 6:
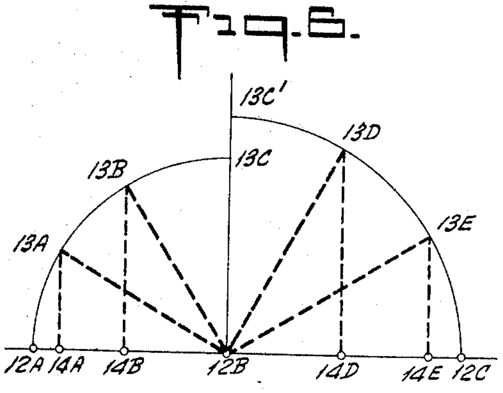
Figure 7:
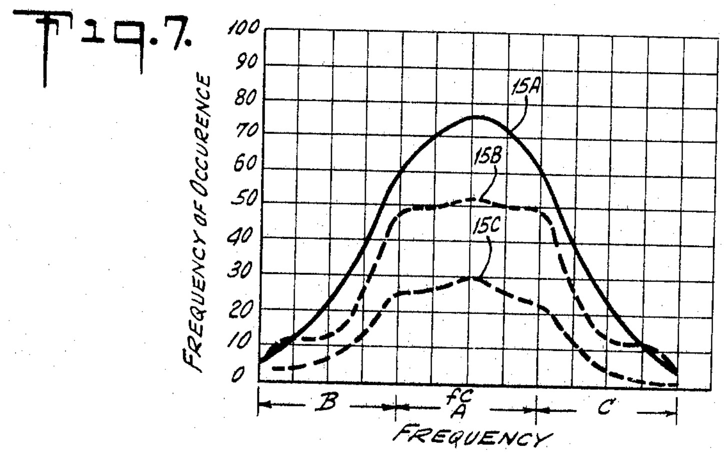
Figures 8, 9:
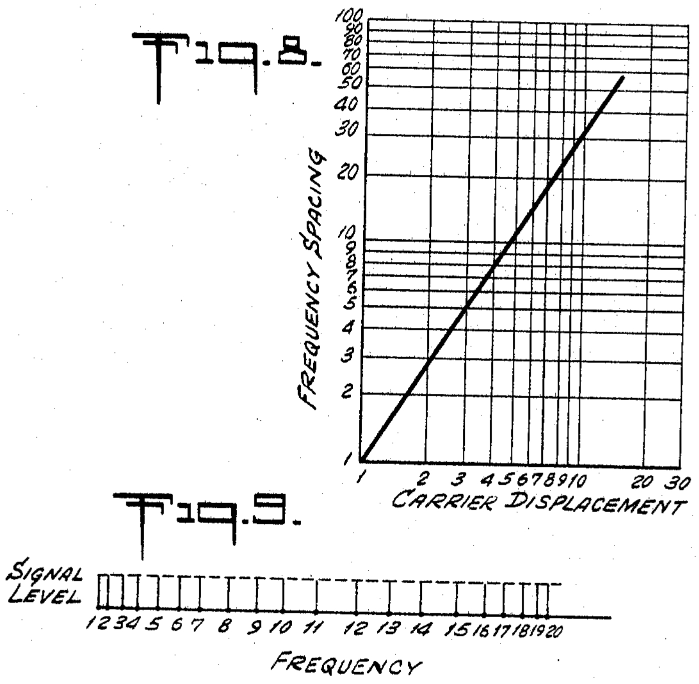

All of the objects, features and advantages of this invention and the manner of attaining them will become more apparent and the invention itself will be best understood by reference to the following description of an embodiment of the invention taken in conjunction with the accompanying drawing, in which:

FIG. 1 is a schematic block diagram of a transmission network for performing common amplification of multifrequency carriers according to this invention, FIG. 2 is a typical example of the input versus output gain characteristic of the transmitting subsystem network illustrated in FIG. 1, FIG. 3 is a typical example of an equally-spaced frequency allocation system that has been conventionally adopted in transmission of information signals, FIG. 4 is a typical example of the spectral distribution of third order intermodulation products when multifrequency carriers with the frequency allocation as illustrated in FIG. 3 are applied to a common amplifier as shown in FIG. 1, FIG. 5 shows a diagram illustrating the manner in which carrier frequencies according to an embodiment of this invention can be allocated in a usable frequency pass band, FIG. 6 shows a graph illustrating the manner in which carrier frequencies according to another embodiment of this invention can be allocated in a pass band, FIG. 7 illustrates the spectral distribution curves of the third order intermodulation products according to a conventional equally-spaced frequency allocation system, and according to embodiments of this invention, respectively, FIG. 8 is a graph illustrating the manner in which frequency allocations according to an embodiment of this invention can be determined under specific given conditions, and FIG. 9 shows a frequency allocation diagram obtained from the graph of FIG. 8.

Referring now to FIG. 1, there is shown a schematic block diagram of a transmission network for performing common amplification of multifrequency carriers according to this invention. In this figure, the symbols 1A, 1B, 1C, 1D . . . 1N denote N signalling sources for the different carrier frequencies, each incorporating means for modulating the carrier with the information signal. The numeral 2 indicates a combiner for combining the outputs of the carrier signalling sources 1A, 1B, 1C, 1D . . . 1N into one carrier group. The numeral 3 denotes a transmitting common amplifier for amplifying multifrequency carriers contained in the carrier group in common, and 4 represents a transmitting antenna for transmitting the output of the common amplifier 3. The numeral 5 represents a receiving antenna for reception of the transmitted output numeral, and 6 denotes a receiving common amplifier for amplifying the multifrequency carriers contained in said carrier group. The numeral 7 indicates a distributor for separating the received carrier group into individual carrier frequencies, which may be composed of, for instance, a group of filters, and 8A, 8B, 8C . . . 8N denote, respectively, demodulators constituting one group for demodulating the outputs of the distributor 7. The compositional principles of this network are not essential to the concept of the invention even if well known means such as frequency conversion or frequency multiplication are employed.

FIG. 2 is a diagram illustrating a typical example of the input versus output gain characteristic of the transmitting subsystem contained in the network of FIG. 1, wherein the abscissa and the ordinate denote the input voltage and the output voltage respectively. As illustrated, when the magnitude of the input signal exceeds a certain limit, the characteristic shows a saturated state and exhibits nonlinearity. It has been common practice to enhance the transmission efficiency by operating power amplifiers in their regions of saturation.

FIG. 3 is a diagram illustrating a typical example of the conventional equally-spaced frequency allocation method, the abscissa and the ordinate denoting the frequency and the relative signal level, respectively. [Note that the numerals denote carrier frequency location numbers.] The above-mentioned treatise by C. J. Stypers deals with such equally-spaced frequency allocations.

FIG. 4 shows a graphical representation of the spectral distribution of the third order intermodulation products that occur when twenty equally-spaced multifrequency carriers as illustrated in FIG. 3 are applied to the common amplifier illustrated in FIG. 1, the abscissa and the ordinate denoting the frequency and the frequency of occurrence, respectively. This diagram is indicated in FIG. 6 on page 141 of the above-mentioned treatise. Referring to FIG. 4, $fc$ denotes the center frequency, $\Delta f$ the frequency spacing, $m$ represents a measure of the location of a carrier counted from the center frequency, and $fc \pm 10\Delta f$ denotes the pass band. Regions A, B and C in FIG. 4 denote respectively the pass band, the lower sideband, and the upper sideband.

As will be evident from this spectral distribution curve, the third order intermodulation products occur most frequently within the pass band and in the largest number, at the center frequency. It will be readily apparent that the amount of intermodulation occurring in performing common amplification of multifrequency carriers as shown in FIG. 1 falls within the allotted frequency bands and notably concentrates in the proximity of the center frequency of the pass band, thus causing interference.

FIG. 5 shows a graph illustrating the manner in which frequency allocations may be graphically obtained for an embodiment of this invention. In accordance with this procedure, the arc of a semicircle is first divided into a number of equal parts in accordance with the number of carriers, for instance, at 9A, 9B, 9C, 9D, and 9E in a particular case when the number of carriers is seven. The division points are projected on the diameter 10A–10B to obtain points 11A, 11B, 11C, 11D, and 11E. It is possible to allocate seven frequencies so that the frequency spacings are proportional to the intervals 10A–11A, 11–11B, 11–11C, 11C–11D, 11D–11E, 11E–10B, such as 70 mc., 71 mc., 72.85 mc., 76 mc., 78.8 mc., 81.15 mc., and 82 mc.

FIG. 6 shows a graph illustrating a manner of graphically determining frequency allocations for another embodiment of this invention. As illustrated, two quarter circles having different radii are drawn on the common diameter 12A–12C. The arcs of the quarter circles are respectively divided into equal parts, for example, as shown at 13A, 13B, and 13C, and at 13C′, 13D, and 13E. The division points are projected on the diameter 12A–12C to obtain points 14A, 14B, 12B, 14D, and 14E.

It is possible to allocate seven frequencies so that the frequency spacings may be approximately proportional to the lengths 12A–14A, 14A–14B, 14B–12B, 12B–14D, 14D–14E, and 14E–12C, as for instance, 70 mc., 70.8 mc., 72.6 mc., 75.5 mc., 78.8 mc., 81.4 mc., and 82.3 mc. The center frequency of FIG. 6 is shifted by 13C–13C′/2 in the left direction as compared with that of FIG. 5. In such manner it will be seen that carrier frequencies are allocated so as to be dense at each end and relatively widely spaced in the region of the center frequency.

FIG. 7 shows a diagram illustrating the spectral distribution of the third order intermodulation products available by the embodiments described above, the abscissa and the ordinate being taken as the frequency and the frequency of occurrence, respectively. Curve 15A represents the frequency of occurrence of the third order intermodulation products for a conventional frequency allocation system which comprises five equally-spaced carrier frequencies. Curve 15B represents the corresponding curve for the frequency allocation system determined by the diagram of FIG. 5 while curve 15C represents the corresponding curve for the frequency allocation system determined by the diagram of FIG. 6.

As will be evident from FIG. 7, the amount of intermodulation products falling within the allocated frequency bands in the usable frequency band can be reduced markedly by adopting the frequency allocation system according to this invention.

Now let it be assumed that the allotted frequency bandwidth of each carrier is, for example, 500 kc.—that is, ±250 kc. from the allotted frequency. Then the summation of the allotted frequency bandwidths for the embodiment of FIG. 6 is 500 kc.$\times$7=3.5 mc.; this is very narrow when compared with the usable pass bandwidth of approximately 12.5 mc.

Frequency allocations of this kind are always practicable provided the usable pass bandwidth is sufficiently large compared with the summation of the allotted frequency bandwidths. This enables the amount of intermodulation products falling within the allotted frequency bandwidths to be reduced to the order of approximately ½ to ⅓ compared with the conventional frequency allocation system, as will be evident from the diagram of FIG. 7.

The ratio of the usable pass bandwidth to the allotted bandwidths is generally indefinite and a frequency allocation system applicable to such cases will now be described.

FIG. 8 shows a graph illustrating the manner in which frequency allocations according to an embodiment of this invention can be found under specific given conditions. In this figure, the abscissa denotes a measure of the displacement of a carrier counted from either end of the pass band and the ordinate denotes the normalized frequency spacing between the carrier and the carrier at the end of the pass band, expressed as a multiple of the shortest frequency spacing at the end taken as unity.

Let it be assumed that the number of carriers is twenty, that the pass bandwidth is three times the summation of the allotted bandwidths, and that ten carriers need to be allocated on each side of the frequency located approximately at the center of the pass band.

A graphical solution of the upper frequency side allocation method is as follows: First, a point is plotted for which $x=10$ and $y=10\times3=30$. Next, a straight line is drawn passing through this point and the origin. Then the frequency spacings of the ten carriers as a multiple of the narrowest frequency spacing at the end of the pass band taken as unity will be 1.0, 2.8, 5.1, 7.8, 11.0, 14.0, 18.0, 22.0, 26.0, 30.0.

Although the lower frequency allocation may be made preferably symmetrical with the upper frequency allocation, it is generally more effective to make these allocations unsymmetrical, as shown in FIG. 6. Thus twenty carrier frequencies may be allocated by suitably changing the shortest frequency spacing at the end of the lower frequency side from the shortest frequency spacing at the end of the higher frequency side.

FIG. 9 is an embodiment of the frequency allocation according to the invention which has been obtained in such a manner, the abscissa and the ordinate being respectively taken as the frequency and the relative signal level. In this figure, the numerals denote the carrier number.

Given the ratio of the usable frequency bandwidth to the summation of the allotted bandwidths and the number of carriers to be allotted, the frequency allocation can be determined generally by reference to this graph. For instance, let the abscissa X and the ordinate Y be taken as the carrier number and the normalized frequency spacing, respectively. Then the frequency spacings for all carriers may be given by $$Y = X \log B / \log nb$$

where

B=pass bandwith $b$=allotted bandwidth for each carrier, and $2n$=number of carriers The frequency allocation method for cases where upper and lower sidebands are shifted respectively by the amount $\delta$ from the center frequency such as $B/+\delta$ and $B/2-\delta$ may be handled by similar reasoning.

While the principles of this invention have been described above in connection with specific embodiments, it is to be clearly understood that this description is made only by way of example and not as a limitation on the scope of the invention and accordingly, various other embodiments are possible, and a number of modifications to the embodiments may be made without departing from the scope or spirit of the invention. It will further be understood that although the description has been made using certain parts directly related to the invention, various other well-known means may be substituted therefor.

What is claimed is:

1. A method for allocating the position of a plurality of carrier waves of different frequencies within the frequency passband of a common amplifier, comprising the steps of assigning a chord having a length representative of a selected portion of the passband with an end thereof in coincidence with an end of the chord, applying an arc of a circle to the chord with the arc commencing at the chord end in coincidence with the end of the passband, dividing said arc into equal segments of a number in accordance with the desired number of carrier waves, projecting the division marks between said segments onto said chord, with each projection mark representing the desired frequency location of a carrier wave within the passband, whereby said waves are spaced gradually closer towards said end of the frequency band than at the center thereof.

2. The device as recited in claim 1 wherein said frequency spacings predetermined relationship is established in accordance with the relationship $$Y = X^{B/2n\pm\delta}$$

where Y is indicative of the frequency spacing of a carrier signal from the carrier signal located adjacent the end of the pass band, X is indicative of a designated carrier signal and is expressed in whole integers, B/2 is representative of the half of the pass band B, $\pm\delta$ is representative of the change in frequency of the half pass band, and $n$ is indicative of the total number of carrier signals spaced in the bandwidth $B/2\pm\delta$.

3. The device as recited in claim 1 wherein said frequency spacings predetermined relationship is determined by projecting a plurality of intersections of the radius of the circle having its center coincident with the other end of the chord onto the chord wherein the radius intersects the circle at evenly spaced circumferential locations representative of the number of carrier signals.

4. The device as recited in claim 3 wherein said frequency spacings predetermined relationship is further dedetermined by selecting a chord length commensurate with the diameter of the circle with the center of the circle located on and midway of the chord.

References Cited

UNITED STATES PATENTS

| | | | |
|---|---|---|---|
| 2,298,409 | 10/1942 | Peterson | 179—15 |
| 2,421,727 | 6/1947 | Thompson | 325—3 X |
| 2,579,070 | 12/1951 | Hansell | 325—3 X |
| 2,579,882 | 12/1951 | Thompson | 325—3 X |
| 3,171,894 | 3/1965 | Kaufman et al. | 325—47 X |

OTHER REFERENCES

"Mathematical Lectures," vol. II, Bridge, B., Cadell and Davies, London, 1810. (Copy in Scientific library QA533, B851), pages 12 and 13 relied on.

ROBERT L. GRIFFIN, Primary Examiner

B. V. SAFOUREK, Assistant Examiner

U.S. Cl. X.R.

325—65; 343—200